Dec. 14, 1948.  H. G. GOOD  2,456,404
GATHERER FOR SILAGE HARVESTERS
Filed Feb. 10, 1947  4 Sheets-Sheet 1

HARVEY G. GOOD INVENTOR.

BY
Chas W Shell
his Attorney

Figures 4, 5:
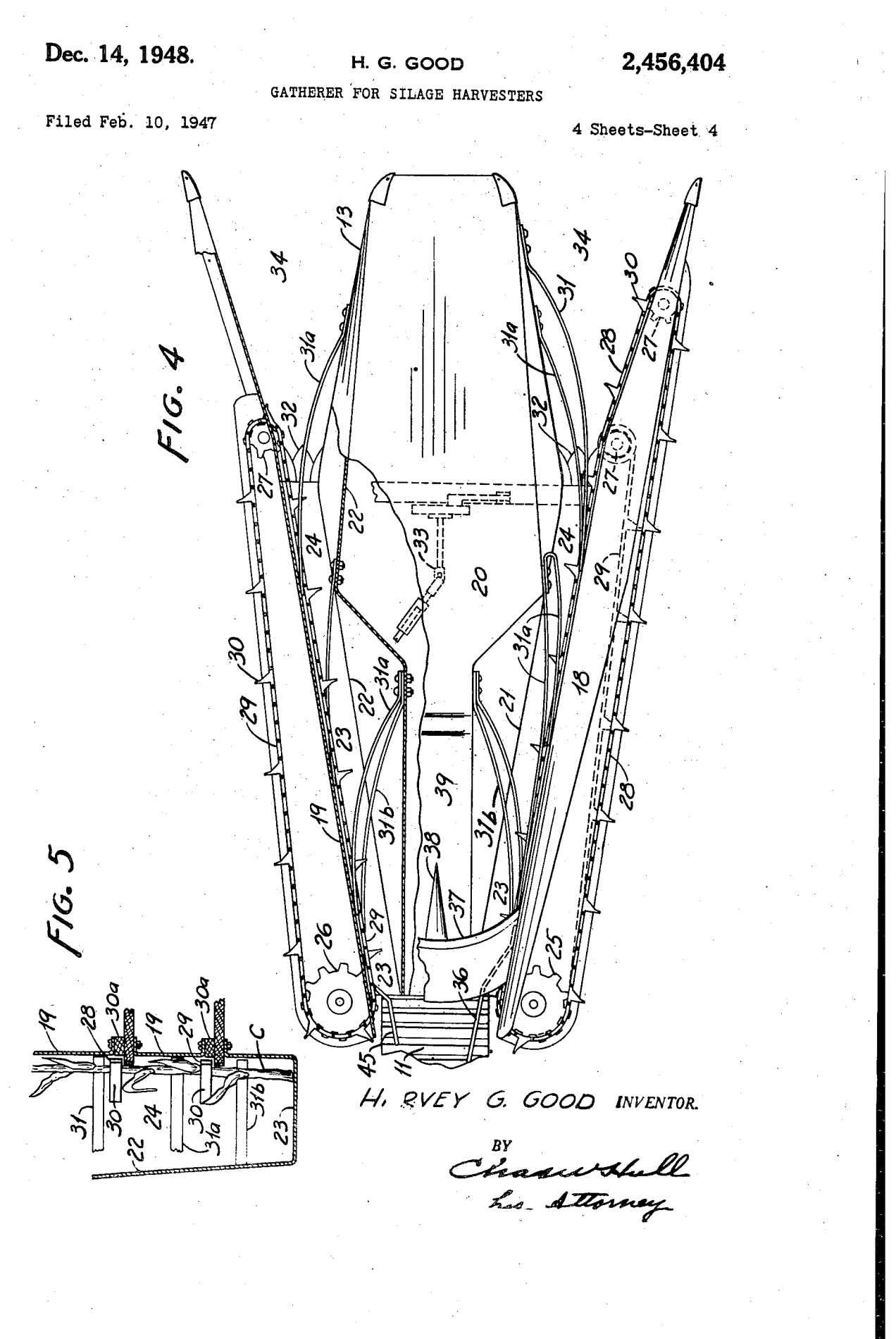

Dec. 14, 1948.   H. G. GOOD   2,456,404
GATHERER FOR SILAGE HARVESTERS
Filed Feb. 10, 1947   4 Sheets-Sheet 4

HARVEY G. GOOD INVENTOR.

BY
*Chas. W. Hull*
*His Attorney*

Patented Dec. 14, 1948

2,456,404

UNITED STATES PATENT OFFICE 2,456,404

GATHERER FOR SILAGE HARVESTERS

Harvey G. Good, East Earl, Pa.

Application February 10, 1947, Serial No. 727,588

10 Claims. (Cl. 56—98)

The present improvements relate to harvesting machines and more particularly to that type of machine known as a silage harvester which gathers standing or earth-bound crops from a field and prepares them for delivery to a silo.

A primary object of the invention is to provide an improved silage harvester, particularly adapted for gathering earth-bound crops or corn stalks growing in a field, and processing them for delivery, in chopped condition, to a silo. Devices of this general type have been developed, but have been designed for treating only one row of corn, or have been of the trailer type, whereby a tractor or other motive power pulls the harvester behind it. In the trailer type harvester, several rows of corn around the perimeter of the field must first be cut by hand, to provide a path for the tractor. Such harvesters cannot function without this preliminary hand preparation of the corn field. As distinguished from such devices, the present improvements have the gathering or harvesting device suspended in advance of the tractor or motive power in the nature of an apron or "snow-plow," so that, after transit, the machine may enter directly into a field of growing corn, without any preliminary treatment, may be driven about the field in either a clockwise or counter-clockwise direction, and the corn harvested and chopped in the field for delivery to the silo.

Another object is to provide a silage harvester of the apron type having means for harvesting two rows of stalks simultaneously and without becoming jammed or fouled. A further object is to provide an adjustable apron so that the stalks may be severed at different levels, if desired. In connection with this adjustable feature, the apron may be elevated to a position for travel on highways, and a further object is to provide means for automatically disconnecting the power from certain moving parts of the harvesting mechanism when the apron is elevated to a position for highway travel. Moreover, a further object is to provide means whereby the apron may be slightly elevated in transit through a corn field, when uneven terrain, such as gutters or rocks, are encountered.

The invention further contemplates an improved stalk gathering unit of the apron type, wherein a novel ramp, stalk gathering and propelling means are associated for positively gripping the stalk from its earth-bound state, and throughout its travel to the chopping unit. A further object is to provide a pair of such ramps and associated elements, operating on two rows of stalks in the same manner and uniting them into a common or single stalk train, and delivering them into the chopping unit, without releasing the positive grip until after the stalks have been seized by the chopping unit.

Additional objects include the provision of improved means for severing the growing stalks, propelling them in a standing position along the ramp, and improved and novel means for depressing the stalks to a prone position with the butt ends toward the chopping unit.

A further object is to provide a novel arrangement of elements whereby the stalks ascend the ramp in a standing position, and while still held or gripped, are turned about a horizontal axis to a prone position while still advancing, until seized by the chopping unit.

Another object of the improvements is to provide means associated with the upper end of the ramp and gathering chains, for disengaging the stalk from one chain, while the other chain continues to propel the stalk.

A further object is to provide a silage harvester of the type described, which is simple in operation, light in weight, easy to maintain and to handle, and which may be turned around in a small space, is speedy and efficient in the field without injury to the ground, as well as a two row harvester which will not become jammed or fouled.

An additional object of the invention is to provide a novel harvester for corn stalks, which may enter a field at any point, and be driven in either a clockwise or counterclockwise direction, without any change in parts.

Other objects and advantages may occur to those skilled in the art and will be apparent from the following description and from the drawings, in which conventional elements are not illustrated in detail.

In the drawings,

Figure 4 is a top view partly in plan, and partly in section certain parts removed and, with parts broken away, of the crop-gathering unit, in association with a portion of the chopping unit.

Figure 5 is an enlarged section of one of the ramps with a corn stalk shown in association with parts of the chains and resilient members. This partial, enlarged section is taken on Figure 4, looking away from cutter 32, longitudinally toward the rear of that guideway or ramp 24 which is uppermost in Figure 4.

Figure 1:
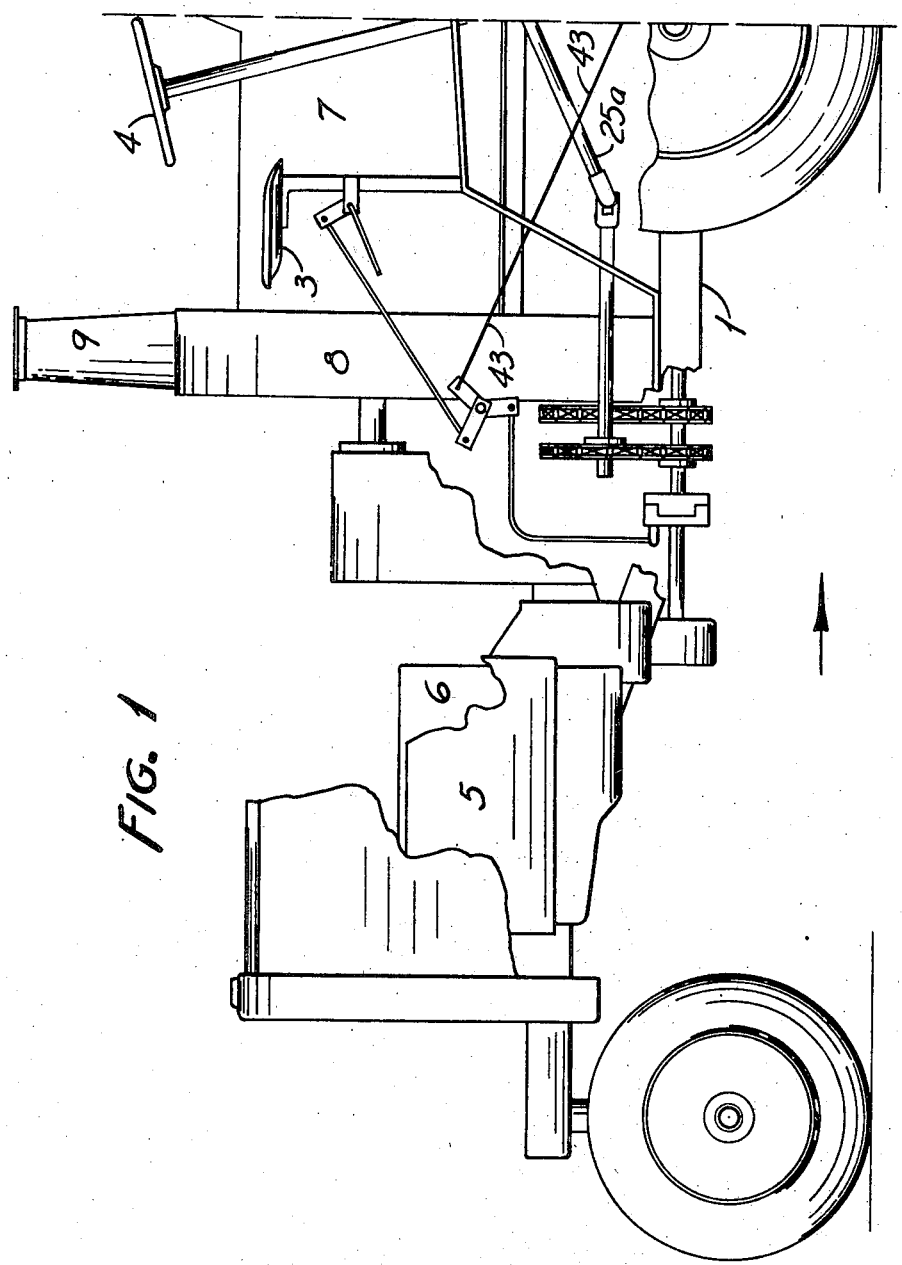
Figure 1 is a side elevation, with parts broken away, of the rear half of the improved harvester.
Figure 2:
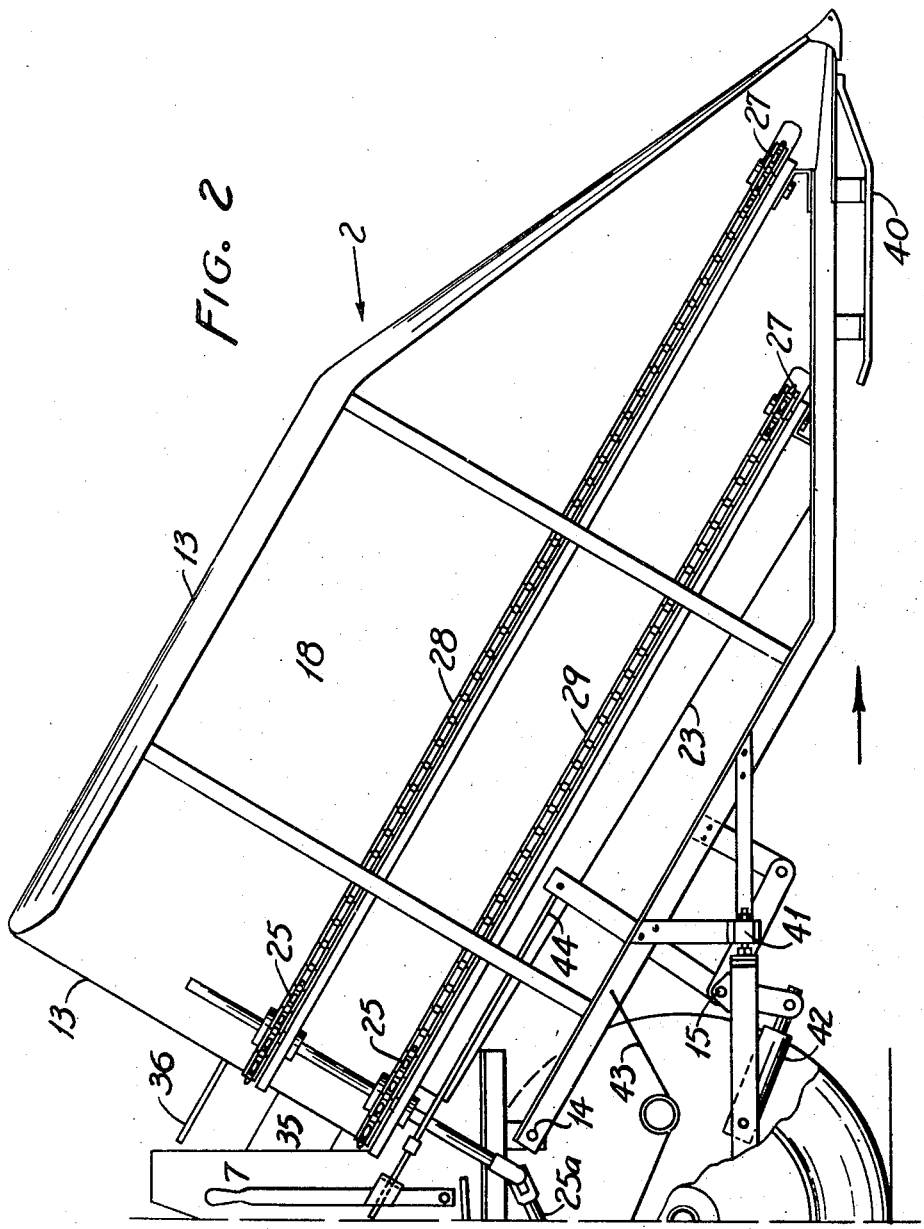
Figure 2 is a side elevation of the forward half of the improved harvester, certain details being omitted for convenience in illustration.

Figures 1 and 2 illustrate one embodiment of the improved silage harvester wherein 1 is the tractor and 2 is the forwardly projecting apron unit. The device travels in the direction of the arrow, and is operated by a driver in seat 3 with a steering wheel 4 at which region various other operative parts are operated by the driver by hand levers and foot pedals, not shown. For example, the driver, from his seat, in addition to the usual tractor controls, has control of the traction wheels and gathering chains through suitable clutches from one engine or power unit, and has control of the stalk severing knife, feed rolls, stalk chopper and hydraulic lift from another engine or power unit through suitable clutches. While the present embodiment is designed with two separate power units, it is apparent that a single power unit may be provided without departing from the scope of the improvements.

In the present embodiment, the separate power units are designated 5 and 6, the chopping unit is 7 and the blower and silage discharge conduit are designated 8 and 9, respectively. The parts 7 to 9, comprising the chopping unit, are conventional and serve to chop and cut up the corn stalks and deliver them, by blower 8, through conduit 9 to a receptacle, such as a trailer (not shown) following the tractor. The silage is then in condition, without further treatment, for delivery to a silo.

Figure 3:
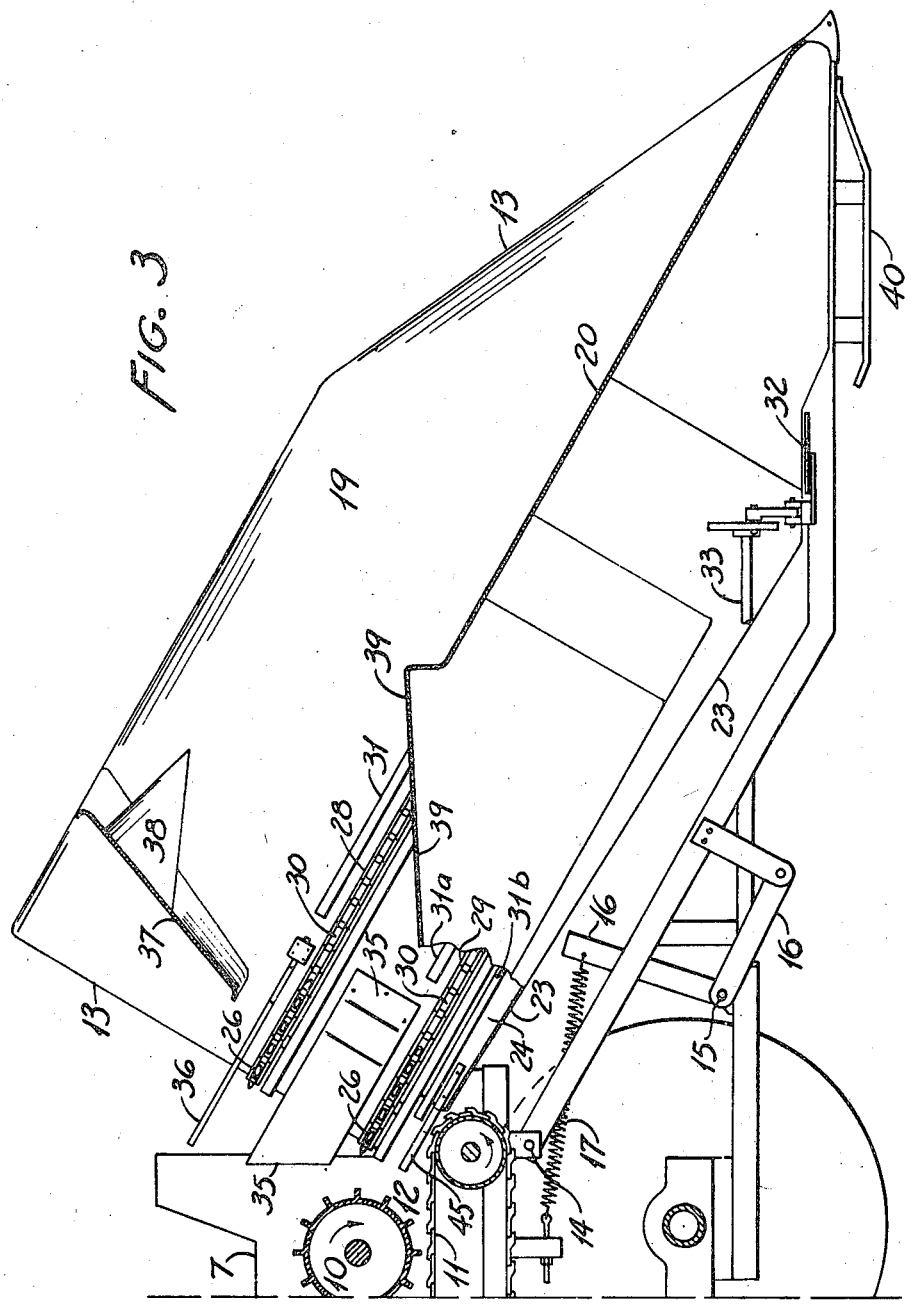
Figure 3 is a longitudinal medial section of the portion of the device illustrated in Figure 2, with certain parts removed.

Upon reference to Figure 3, elements 10 and 11 of the chopping device 7 are illustrated at the forward region of the tractor chassis. These elements serve as a conveying means and comprise a wheel 10 and an endless web 11, revolving in the direction of the arrows for seizing therebetween the corn stalks fed to the mouth 12, which mouth is formed by these elements. As illustrated, the wheel 10 and web 11 have transverse projections or cleats, for catching onto the corn stalks as later described.

Located adjacent the mouth 12 is an apron-like stalk gathering unit 13, pivoted at 14 and 15. The pivot 15 provides an axis for bell-crank 16, to which is anchored one end of springs 17 for suspending the inlet end of the apron a short distance above the ground. The other ends of said springs are anchored to the chassis of the tractor. The outlet end of the apron is located contiguous to mouth 12, as hereinafter described.

The apron-like gathering unit comprises outer walls 18 and 19 and a central section 20. Section 20 also has inner side walls 21 and 22, spaced from walls 18 and 19. The adjacent inner and outer walls are joined, at their lower edges, by upwardly inclined troughs 23, and these elements form a ramp, guideway or stalk passageway 24 (see Figure 5) along opposite sides of the apron. As is apparent, upon reference to Figures 3 and 4, the outlet ends of the guideways or ramps terminate and are disposed over the web 11, and adjacent the mouth 12.

In the preferred embodiment illustrated, the guideways or ramps 24 are designed to converge in an inverted V-shaped relation, as hereinafter described.

A pair of sprockets 25 and another pair 26 are mounted on either side of the apron near its rear or outlet end, and are positively driven directly on either side through connections 25a, from the power unit 6, and independently of the traction wheels. Only one such connection is illustrated. At the inlet or forward end of the apron, four idle sprockets 27 are mounted, two on each side. Upper endless chains 28 and lower endless chains 29 are mounted in spaced relation on these sprockets on either side of the apron, and are driven by power unit 6, through connections 25a and sprockets 25 and 26. These chains are disposed along the outer walls of each guideway or ramp 24 and have gripping fingers 30 for engaging and propelling the corn stalks. These members serve as upper conveyors and as lower conveyors, as hereinafter described. In Figure 4, the parts are broken away, so that, in the upper portion of the view, only the lower chain 29 is seen, while, in the lower portion of the view, portions of both chains are seen. As seen in Figures 2, 3 and 5, these chains are spaced vertically so that the fingers may grip and engage the stalk at spaced points—e. g., near the butt end and near the middle of the stalk. Intermediate the sprockets, along the outer wall of each ramp, a bearing plate 30a (see Figure 5) is provided behind and throughout the length of each chain, and the chains ride along these plates, which function to keep the chain elements in the same plane during ascent.

A series of resilient members 31, 31a and 31b are anchored at one end and are mounted at intervals along the inner walls 21, 22. Thence, they project outwardly across each ramp, having their free ends yieldingly associated with the outer walls 18, 19. While any arrangement of resilient members may be employed without departing from the scope of the invention, the preferred embodiment has a series of such members, as illustrated, throughout the length of the ramps, at three levels, viz., between the chains as well as above and below them, as seen in Figures 3 and 4. In the illustrated embodiment, an upper resilent member will be seen at 31, in Figure 3, a middle resilient member at 31a and a lower resilient member at 31b. These members are the rearmost members of the series at three levels. In Figure 4, the upper resilient members, regardless of their position along the extent of guideways 24, are all designated 31. Only one such member is shown, others being removed to avoid confusion. Likewise, all middle resilient members are marked 31a and all lower resilient members are marked 31b. It will be seen, therefore, upon comparing Figures 3, 4 and 5, that these members are at three levels and, at each level, consist of several members, as needed, spaced from the forward to the rear end of each guideway. It is apparent that only one such stalk engaging member may be employed at the upper, middle or lower level, without departing from the invention.

At the forward or inlet end of each guideway or ramp, a cutting device 32 is provided. This comprises a reciprocating knife driven by suitable power means through connection 33.

The inlet or forward ends of the guideways or ramps 24 are spaced to coincide with the distance between two rows of earth-bound or growing corn. As the device advances through a field, the pair of inlets 34 on the apron unit 13 each meet and embrace the growing stalks until the reciprocating knives encounter the stalks and sever them. At this stage, the fingers 30 of the upper and lower chains seize the stalks at spaced points and propel them, in standing condition, up the guideways or ramps 24. As the stalks are ascending, the resilient members 31, 31a and 31b press against them to insure that the stalks remain standing, and press the stalks against walls 18 and 19, as the case may be, while the fingers 30 of both upper and lower chains, as well as the chains themselves, grip and propel the stalks. The bottom or lower face of the butt ends of the stalks rest, during transit, on the inclined troughs 23, which form the floor of each guideway 24. This arrangement of parts is illustrated in operative relation with a severed corn stalk C, in Figure 5.

It is the usual practice, in silage harvesters, to cut one row at a time or, if two rows are cut, to employ a trailer device. This is attributable to the difficulty of handling two rows, in an apron-type device, without jamming or fouling the mechanism. In this present invention, this is overcome by insuring a positive grip or hold on the stalks at all times, and merging them into a common train of interlaced, moving stalks. Accordingly, the stalks are kept moving at all times and no "dead areas" exist wherein the stalks may become arrested and jam the stalks which are following.

In achieving this end, an improved arrangement is provided near the rear or outlet ends of the guideways or ramps 24 and adjacent the mouth 12 of the chopping unit. To those skilled in the art, it is apparent that the butt end of the stalk must precede the tassel end into the chopping unit, so that the leaves and ears are not sheared off and lost, and also because travel with the tassel end first would cause jamming of the mechanism due to the loose leaves and ears clogging the mouth 12.

Accordingly, as the standing stalks ascend guideways or ramps 24, means are provided for depressing or lowering the stalks from standing position to a reclining or prone postion, in a gradual, unhurried movement, with the butt ends ahead of the tassel ends, during which movement the stalk is still being gripped and positively advanced to avoid clogging or stalling of the machinery. Any movement by chance, such as under the influence of gravity, is avoided.

To accomplish this, a plate 35 and rod 36 project into the upper or outlet portion of each ramp to engage the oncoming stalk at its upper region. These release elements 35 and 36 project into the ramp area to an extent greater than the length of fingers 30 of the upper chain 28, so that the stalks engage them and are freed of those fingers. At this stage also, the upper resilient members 31, and the middle resilient members 31a are terminated and no longer contact or press against the stalks. Upon reference to Figure 3, it will be seen that the rearmost of the series of members 31 and 31a terminates in a vertical plane somewhat short of the end of guideway 24, and short of the termination of the rearmost of the series of members 31b. At this stage, the upper or tassel end of the stalk encounters a barrier in the form of a bridge 37, having an abutment or separator 38. The bridge 37 spans the rear or outlet ends of the guideways or ramps and is fastened to walls 18 and 19, above the upper chains. At this stage also, and without interruption, the fingers 30 on the lower chains 29 are still gripping and advancing the butt ends, and the rearmost of the series of lower resilient members 31b are still pressing the stalks against the walls, so that the stalks have their butt ends moving forward continually, while their upper ends encounter and are arrested by the barrier or bridge 37 with the result that they are carried about a horizontal axis, while gripped by chains 29 and the aforesaid members 31b, until they recline along table or platform 39 provided by the central section 20 of the apron. During this movement from standing to reclining position, the lower chains 29 advance the butt ends of the stalks until they ride up to the ends of troughs 23, whence these butt ends continue off of the troughs and onto the web 11, where they are immediately propelled onward by web 11 and its cleats, to the mouth 12 and roller 10. These parts, thereupon pull the stalks off of the guideways or ramps about the instant the lower chains 29 and fingers 30 release their grip, by passing around sprockets 25, and out of engagement with the stalks. In order to insure against the possibility of the butt end and leaves of the stalks becoming tangled with the lower chains and fingers, a projecting guide 45 is provided, projecting into each ramp, to prevent the stalks from following the lower chains and fingers around the lower sprockets.

It is noteworthy that the platform 39 is disposed on substantially the same plane as the mouth 12, and meets the troughs 23 of the guideways or ramps 24 at a common level at the outlet or rear end of the apron unit 13, over the web 11, and contiguous to mouth 12 (see Figures 3 and 4). The lower feed chains 29 are disposed about five to six inches above the troughs 23 and, as the butt ends leave the troughs and chains 29, they are carried forward by web 11, while the major portion of the stalk reclines along platform 39, in direct line to facilitate feeding through mouth 12.

Moreover, the release elements 35 and 36 are so positioned, with respect to the upper chains 28 and bridge 37, to cooperate in the stalk depressing movement. It will be seen also, more particularly in Figure 3, that the plane of the bridge 37 is located so as to substantially pass through the mouth 12.

The movements just described are duplicated near and at the rear or outlet end of each guideway or ramp 24, and, as the guideways or ramps converge in inverted V-shape form, the stalks from each ramp merge in a common train as they are converted from standing to reclining position. In this movement, the volume of stalks coming from the two sides meet as they are reclined, are interwoven and matted as their leaves, ears and stalks catch on each other, so that the stalks operate on each other to sustain the advance movement without interruption. The pull of the roller 10 and web 11 on the stalks already seized causes such stalks to pull along following stalks which are matted therewith.

The separator 38 is a stud or abutment projecting forwardly of the middle of the barrier or bridge 37. This element assists in guiding the canting stalks from falling over to the opposite ramp, and prevents the formation of the common train of stalks until the stalks are close to reclining position.

It will be noted that the force of gravity on the stalks is not employed in this transition movement. The lower chains 29 and the lower resilient members 31b grip the butt end of the stalks until after the web 11 seizes them, and the coaction of these elements, as the upper end of the stalk encounters barrier or bridge 37 causes a slow unhurried "fall" from erect to prone position along platform 39, without depending on the force of gravity.

It is thus seen that two rows of growing stalks are severed, gathered and positively conveyed to the chopping device without clogging, jamming or stalling of the machinery. The stalks are, therefore, under control at all times.

It is significant that the successful operation of the stalk-gathering unit is not dependent upon the presence of a mass of stalks or the presence of a stalk between each finger 30 of such chain. It sometimes happens that a row of standing corn has certain underdeveloped stalks, so that there may be considerable space between mature stalks in a row. Notwithstanding such circumstances, even though only a single stalk is encountered, cut and propelled up one ramp of the unit, it will reach the chopping unit 7, in the same manner as in the case described for a continuous series of stalks.

In addition to the foregoing, the forward end of the apron is provided on either side with skids 40. As the device advances, should rocks or uneven terrain be encountered, the apron rides up on the ground by means of the skids, as it swings about pivots 14 and 15. Springs 17, heretofore described, form a cushion for the return of the apron to lower position, where it rests on either side on adjustable studs 41. These studs may be adjusted to determine the level of the inlet end of the apron, so that the height at the cut on the corn stalk may be varied, if desired.

When it is desired to elevate the apron to an inoperative level for highway travel, the driver actuates the hydraulic lift 42 and, as the apron elevates, it actuates clutch knock out elements 43 and 44, so as to arrest movement of the chains 28 and 29, and the roller 10 and web 11.

It will be apparent to those skilled in the art that the present improvements are adapted to enter a corn field at any point, and begin operation at once, regardless of whether the driver desires to drive around the field in a clockwise or counter clockwise direction.

Harvesters of this general type have, heretofore, been capable of travel about a field in only one direction, due to the fact that the so-called gathering unit is positioned for travel at only one side of the tractor unit. In the present improvements, as aforesaid, the machine may travel in either direction about a field without any change in the location of parts, or may be driven directly through the center of a field, if desired.

In the event that it is desired to cut crops other than corn, from a field, for silage purposes, my invention is so designed that the apron unit 13 may be removed and replaced with one of another well-known type, for cutting and conveying hay, straw and the like to the chopper 7

I claim:

1. A plural row silage harvester having a forward stalk receiving portion, a rear stalk orienting and discharging portion and comprising a frame, a plurality of stalk receiving longitudinally disposed guideways inclined upwardly from said forward portion to said rear portion, each guideway having substantially vertical and parallel side walls, said guideways converging from the forward ends thereof toward the rear, stalk cutting means at the forward end of each guideway, upper and lower longitudinally arranged conveyors disposed adjacent one wall of each guideway, stalk engaging means on each conveyor whereby stalks will be moved along said guideways upon operation of said conveyors, a plurality of elongated resilient members secured to said frame and extending rearwardly and laterally across each guideway adjacent said conveyors whereby stalks engaged by said resilient members will be urged into engagement with said conveyors, said resilent means adjacent said upper conveyors terminating forwardly of the rear ends thereof the resilient means adjacent said lower conveyors terminating substantially at the rear ends thereof, upper stalk release means secured to said frame adjacent said upper conveyors and forwardly of the rear ends thereof, said upper release means having a portion for engaging and positively releasing said stalks from said upper conveyors, a concave stalk engaging bridge disposed above said release means and extending across said guideways, separator means projecting forwardly from the concave surface of said bridge substantially midway between said guideways whereby intermingling of the upper portions of said stalks is prevented, a stalk receiving platform disposed between said guideways and below said bridge, lower stalk release means secured to said frame adjacent said lower conveyors at the rear ends thereof, said lower release means having a portion for engaging and positively releasing said stalks from said lower conveyors subsequent to release thereof from said upper conveyors whereby the stalks from both guideways merge and are deposited on said platform in substantially parallel intermingled relationship forming a mat, and conveyor means disposed to engage the butt ends of said stalks prior to release from said lower conveyors whereby said stalks are removed from said platform, said stalks being continually moved by conveying means from the time of entry into said guideways until discharged from said harvester.

2. A plural row silage harvester having a forward stalk receiving portion, a rear stalk orienting and discharging portion and comprising a frame, a plurality of stalk receiving longitudinally disposed guideways inclined upwardly from said forward portion to said rear portion, said guideways converging from the forward ends thereof toward the rear, stalk cutting means at the forward end of each guideway, upper and lower longitudinally arranged conveyors disposed adjacent each guideway whereby stalks will be moved along said guideways upon operation of said conveyors, a plurality of resilient members secured to said frame and extending across each guideway toward said conveyors whereby stalks engaged by said resilient members will be urged into engagement with said conveyors, said resilient means adjacent said upper conveyors terminating forwardly of the rear ends thereof the resilient means adjacent said lower conveyors terminating substantially at the rear ends thereof, upper stalk release means secured to said frame adjacent said upper conveyors and forwardly of the rear ends thereof, said upper release means having a portion for engaging and positively releasing said stalks from said upper conveyors, a stalk engaging bridge disposed above said release means and extending across said guideways, separator means projecting forwardly from said bridge substantially midway between said guideways whereby intermingling of the upper portions of said stalks is prevented, a stalk receiving platform disposed between said guideways and below said bridge, lower stalk release means secured to said frame adjacent said lower conveyors at the rear ends thereof, said lower release means having a portion for engaging and positively releasing said stalks from said lower conveyors subsequent to release thereof from said upper conveyors whereby the stalks from both guideways merge and are deposited on said platform in substantially parallel intermingled relationship forming a mat, and conveyor means disposed to engage the butt ends of said stalks prior to release from said lower conveyors whereby said stalks are removed from said platform, said stalks being continually moved by conveying means from the time of entry into said guideways until discharged from said harvester.

3. A plural row silage harvester having a forward stalk receiving portion, a rear stalk orienting and discharging portion and comprising a frame, a plurality of stalk receiving guideways inclined upwardly from said forward portion to said rear portion, said guideways converging from the forward ends thereof toward the rear, stalk cutting means at the forward end of each guideway, upper and lower conveyors disposed adjacent each guideway whereby stalks will be moved along said guideways upon operation of said conveyors, a plurality of resilient members disposed adjacent each guideway and constructed and arranged for engaging and urging said stalks into engagement with said conveyors, said resilient means adjacent said upper conveyors terminating forwardly of the rear ends thereof, the resilient means adjacent said lower conveyors terminating substantially at the rear ends thereof, upper stalk release means secured to said frame adjacent said upper conveyors and forwardly of the rear ends thereof, said upper release means having a portion for engaging and positively releasing said stalks from said conveyors, a stalk engaging bridge disposed above said release means and extending across said guideways, separator means projecting forwardly from said bridge substantially midway between said guideways whereby intermingling of the upper portions of said stalks are prevented, a stalk receiving platform disposed between said guideways, lower stalk release means secured to said frame adjacent said lower conveyors at the rear ends thereof, said lower release means having a portion for engaging and positively releasing said stalks from said lower conveyors subsequent to release thereof from said upper conveyors whereby the stalks from both guideways merge and are deposited on said platform, and conveyor means disposed to engage the butt ends of said stalks prior to release from said lower conveyors whereby said stalks are removed from said platform, said stalks being continually moved by conveying means from the time of entry into said guideways until discharged from said harvester.

4. A plural row silage harvester having a forward stalk receiving portion, a rear stalk orienting and discharging portion and comprising a frame, a plurality of stalk receiving guideways, said guideways converging from the forward ends thereof toward the rear, stalk cutting means at the forward end of each guideway, upper and lower conveyors disposed adjacent each guideway, stalk engaging means adjacent each guideway for urging stalks into engagement with said conveyors, said stalk engaging means adjacent said upper conveyors terminating forwardly of the rear ends thereof, the stalk engaging means adjacent said lower conveyors terminating substantially at the rear ends thereof, upper stalk release means secured to said frame adjacent said upper conveyors and forwardly of the rear ends thereof, said upper release means having a portion for engaging and positively releasing said stalks from said upper conveyors, a stalk engaging bridge disposed above said release means and extending across said guideways, a stalk receiving platform disposed between said guideways, lower stalk release means secured to said frame adjacent said lower conveyors at the rear ends thereof, said lower release means having a portion for engaging and positively releasing said stalks from said lower conveyors subsequent to release thereof from said upper conveyors whereby the stalks from both guideways merge and are deposited on said platform, and conveyor means disposed to engage the butt ends of said stalks prior to release from said lower conveyors whereby said stalks are removed from said platform, said stalks being continually moved by conveying means from the time of entry into said guideways until discharged from said harvester.

5. A plural row silage harvester having a forward stalk receiving portion, a rear stalk orienting and discharging portion and comprising a frame, a plurality of stalk receiving guideways, stalk cutting means at the forward end of each guideway, upper and lower conveyors disposed adjacent each guideway whereby stalks will be moved along said guideways upon operation of said conveyors, stalk engaging means adjacent each conveyor for urging stalks into engagement therewith, said stalk engaging means adjacent said upper conveyors terminating forwardly of the rear ends thereof, the stalk engaging means adjacent said lower conveyors terminating substantially at the rear ends thereof, upper stalk release means operatively associated with said upper conveyors whereby stalks will be released therefrom prior to reaching the rear ends thereof, a stalk engaging bridge extending across said guideways, a stalk receiving platform disposed between said guideways, lower stalk release means operatively associated with said lower conveyors whereby stalks are released therefrom subsequent to release thereof from said upper conveyors whereby the stalks from both guideways merge and are deposited on said platform, and conveyor means disposed to engage the butt ends of said stalks prior to release from said lower conveyors whereby said stalks are removed from said platform, said stalks being continually moved by conveying means from the time of entry into said guideways until discharged from said harvester.

6. A plural row silage harvester having a forward stalk receiving portion, a rear stalk orienting and discharging portion and comprising a frame, a plurality of stalk receiving guideways, stalk cutting means at the forward end of each guideway, upper and lower conveyors disposed adjacent each guideway whereby stalks will be moved along said guideways upon operation of said conveyors, stalk engaging means adjacent each conveyor for urging stalks into engagement thereof, said stalk engaging means adjacent said upper conveyors terminating forwardly of the rear ends thereof, the stalk engaging means adjacent said lower conveyors terminating substantially at the rear ends thereof, a stalk support disposed between said guideways, means operatively associated with said conveyors for releasing said stalks from said conveyors and depositing the same above said support, and conveyor means disposed to engage said stalks prior to release from said first mentioned conveyor means whereby said stalks are removed from said support, said stalks being continually moved by conveying means from the time of entry into said guideways until discharged from said harvester.

7. A silage harvester having a forward stalk receiving portion, a rear stalk orienting and discharging portion and comprising a frame, a stalk receiving guideway, stalk cutting means at the forward end of said guideway, upper and lower conveyors disposed adjacent said guideway whereby stalks will be moved along said guideway upon operation of said conveyors, stalk engaging means adjacent each conveyor for urging stalks into engagement therewith, said stalk engaging means adjacent said upper conveyor terminating forwardly of the rear end thereof, the stalk engaging means adjacent said lower conveyor terminating substantially at the rear end thereof, a stalk receiving platform disposed adjacent said guideway, means for releasing said stalks from said conveyors and depositing the same on said platform, conveyor means disposed to engage said stalks prior to release from said first mentioned conveyors whereby said stalks are removed from said platform, said stalks being continually moved by conveying means from the time of entry into said guideway until discharged from said harvester.

8. A plural row silage harvester having a forward stalk receiving portion, a rear stalk orienting and discharging portion and comprising a frame, a plurality of stalk receiving longitudinally disposed guideways inclined upwardly from said forward portion to said rear portion, each guideway having substantially vertical and parallel side walls, said guideways converging from the forward ends thereof toward the rear, stalk cutting means at the forward end of each guideway, up and lower longitudinally arranged conveyors disposed adjacent one wall of each guideway, stalk engaging means on each conveyor projecting laterally from one guideway wall toward the companion guideway wall, whereby stalks will be moved along said guideways upon operation of said conveyors, upper stalk release means secured to said frame adjacent said upper conveyors and forwardly of the rear ends thereof, said upper release means having a portion for engaging and positively releasing said stalks from said upper conveyors, a stalk engaging bridge disposed above said release means and extending across said guideways, a stalk engaging abutment projecting forwardly from said bridge substantially midway between said guideways whereby intermingling of the upper portions of said stalks is prevented, a stalk receiving platform disposed between said guideways and below said bridge and abutment, lower stalk release means secured to said frame adjacent said lower conveyors at the rear ends thereof, said lower release means having a portion for engaging and positively releasing said stalks from said lower conveyors subsequent to release thereof from said upper conveyors, whereby the stalks from both guideways merge and are deposited on said platform in substantially parallel intermingled relationship, and conveyor means disposed to engage the butt ends of said stalks prior to release from said lower conveyors whereby said stalks are removed from said platform, said stalks being continually moved by conveying means from the time of entry into said guideways until discharged from said harvester.

9. A plural row silage harvester having a forward stalk receiving portion, a rear stalk orienting and discharging portion and comprising a frame, a plurality of stalk receiving guideways, stalk cutting means at the forward end of each guideway, upper and lower conveyors disposed adjacent each guideway whereby stalks will be moved along said guideways upon operation of said conveyors, stalk engaging means adjacent each conveyor for urging stalks into engagement therewith, said stalk engaging means adjacent said upper conveyors terminating forwardly of the rear ends thereof, the stalk engaging means adjacent said lower conveyors terminating substantially at the rear ends thereof, upper stalk release means operatively associated with said upper conveyors whereby stalks will be released therefrom prior to reaching the rear ends thereof, a stalk engaging barrier at the rear end of each guideway, a stalk engaging abutment projecting forwardly from said barrier and substantially midway between said guideways, said barrier and abutment being disposed above the plane of said upper conveyors, a stalk receiving platform disposed between said guideways and below said abutment, lower stalk release means operatively associated with said lower conveyors whereby stalks are released therefrom subsequent to release thereof from said upper conveyors whereby the stalks from both guideways merge and are deposited on said platform, and conveyor means disposed to engage the butt ends of said stalks prior to release from said lower conveyors whereby said stalks are removed from said platform, said stalks being continually moved by conveying means from the time of entry into said guideways until discharged from said harvester.

10. A plural row silage harvester having a forward stalk receiving portion, a rear stalk orienting and discharging portion and comprising a frame, a plurality of stalk receiving guideways, stalk cutting means at the forward end of each guideway, upper and lower conveyors disposed adjacent each guideway whereby stalks will be moved along said guideways upon operation of said conveyors, stalk engaging means adjacent each conveyor for urging stalks into engagement therewith, said stalk engaging means adjacent said upper conveyors terminating forwardly of the rear ends thereof, the stalk engaging means adjacent said lower conveyors terminating substantially at the rear ends thereof; upper stalk release means, including a rigid member projecting laterally into each guideway and operatively associated with said upper conveyors whereby stalks will be released therefrom prior to reaching the rear ends thereof, a stalk engaging barrier at the rear end of each guideway, a stalk engaging abutment projecting forwardly from said barrier and substantially midway between said guideways, said barrier and abutment being disposed above the plane of said upper conveyors, a stalk receiving platform disposed between said guideways and below said abutment, lower stalk release means, including a rigid member projecting laterally into each guideway, positioned in a plane to the rear of said upper release means and operatively associated with said lower conveyors whereby stalks are released therefrom subsequent to release thereof from said upper conveyors whereby the stalks from both guideways merge and are deposited on said platform, and conveyor means disposed to engage the butt ends of said stalks prior to release from said lower conveyors whereby said stalks are removed from said platform, said stalks being continually moved by conveying means from the time of entry into said guideways until discharged from said harvester.

HARVEY G. GOOD.

REFERENCES CITED

The following references are of record in the file of this patent:

UNITED STATES PATENTS

| Number | Name | Date |
|---|---|---|
| 1,457,828 | Erb | June 5, 1923 |
| 1,462,765 | Miller | July 24, 1923 |
| 1,556,872 | Nicholson | Oct. 13, 1925 |
| 1,764,947 | Frank | June 17, 1930 |
| Re. 22,697 | McEachern | Nov. 27, 1945 |